July 31, 1962   R. G. HEATH ET AL   3,047,465
THERAPEUTIC AGENT FOR TREATMENT OF MENTAL ILLNESS
AND METHOD FOR PREPARATION THEREOF
Filed Nov. 14, 1958   3 Sheets-Sheet 1

INVENTORS
Robert G. Heath
Byron E. Leach

BY Cushman, Darby & Cushman
ATTORNEYS

July 31, 1962  R. G. HEATH ET AL  3,047,465
THERAPEUTIC AGENT FOR TREATMENT OF MENTAL ILLNESS
AND METHOD FOR PREPARATION THEREOF
Filed Nov. 14, 1958  3 Sheets-Sheet 2

INVENTORS
Robert G. Heath
Byron E. Leach

BY Cushman, Darby & Cushman
ATTORNEYS 3,047,465
THERAPEUTIC AGENT FOR TREATMENT OF MENTAL ILLNESS AND METHOD FOR PREPARATION THEREOF
Robert G. Heath, New Orleans, and Byron E. Leach, Metairie, La., assignors to The Administrators of The Tulane Educational Fund, New Orleans, La.
Filed Nov. 14, 1958, Ser. No. 773,965
9 Claims. (Cl. 167—74)

The present invention relates to a new composition of matter used for the treatment of mental illness and to a process for the preparation thereof. More particularly, the invention relates to a therapeutic compound utilized in the treatment of schizophrenia by combatting chemical metabolic deficiency in the body, said compound preferably being obtained by hydrolyzing the septal region of the brain.

This application is a continuation-in-part of application Serial No. 586,437, filed May 22, 1956, now abandoned.

An extensive program has been conducted in an effort to establish some correlations between activity of the mind and activity of the brain. Such program has been particularly aimed at determining whether schizophrenia, a major mental disorder, can be correlated with specific physiological irregularities in the brain and associated alterations in bodily chemistry.

The approach to the problem assumes, in view of consistent observation, a basic integrative defect in the personality of the schizophrenic. The behavior trends seen in the schizophrenic can be understood only when considered as a result of this primary deficiency. In connection therewith, it has been found that the unique features of human behavior (e.g., meaningful speech, ability to look to the future and complicated planning) are correlated with ascending levels of neurological developement appearing only with the evolution of the complicated human cerebral cortex.

In determining and analyzing the foregoing correlation, extensive animal investigative studies were carried out. It was from these data as well as the extensive phychodynamic observations in human patients, that evolved the approaches that were ultimately used in developing the present invention.

It was discovered that the septal region of the brain, when stimulated, facilitated motor responses, produced increased alertness, and resulted in the release into the blood stream of several chemical substances, in animals as well as humans. On the other hand, in animals, damage to such region slowed down motor activity, markedly reduced the level of psychological awareness, and, of significant importance, impaired the overall aspects of bodily chemistry which have been found to be important in adaptation corresponding to normal behavior.

In essence, it has been determined that psychotherapy is not the answer to treatment of schizophrenic patients. Granted, social behavior in a schizophrenic can be improved through psychotherapy, but such treatment does not alter the basic symptoms of schizophrenia. This is in sharp contrast to the effect of reconstructive psychoanalysis or social influences in changing basic behavior patterns in a nonschizophrenic, e.g. a neurotic.

With the above in mind, and based on experiments conducted with animals and later with humans which will be referred to below, considerable information was developed to suggest that the septal region might be important in the development of therapeutic procedures in the treatment of schizophrenia. As noted heretofore, when this region is damaged in animals, symptoms developed which were similar to those seen in schizophrenic patients, especially the overall deficiencies in bodily chemistry in association with motor retardation and character disturbances in behavior. Stimulation of such region in animals produced beneficial changes in all these functions. Changes in chemistry were such as to improve the deficiencies found with the disease. The increased speed of motor activity worked towards correction of the slowing down which is characteristic of schizophrenic patients. Thus, methods were developed for further exploration of the influence of this region of the brain in regard to the development of therapeutic procedures in schizophrenia.

Early techniques for exploring this particular region of the brain were quite crude. However, over the past years, it has become possible to accurately place small (½ mm.) electrodes into specifically predetermined regions in the brain with a bare minimum of damage, in such a manner that correlative studies employing several disciplines could be carried out in an integrated manner over prolonged periods. The correlation between recorded electrical activity in the septal region of the brain and behavior has been one of the most important findings. Spike and slow wave in the septal region were seen in schizophrenic patients but not in animals or patients with implanted electrodes who were not schizophrenic. This particular phenomenon was found to be pronounced when patients were severely psychotic and was less apparent during periods of relative remission as, for example, following successful stimulation.

Many studies of different types have been carried out to test this aforementioned basic correlation between recordings and behavior. For example, by means of the electrode system described heretofore, brain wave recordings have been taken from the septal region reflecting alteration of levels of thought induced in interview situations. Such alterations in recordings have also appeared with spontaneous fluctuations in levels of awareness, for example, as a patient moves from sleep to wakefulness. Additionally, induction of alterations in levels of awareness by drugs has produced interesting correlations in recordings.

The next phase involved a determination of the correlation of the septal region with bodily chemistry, in order to associate the latter with the basic symptoms of schizophrenia. It was first thought that the chemical changes for control of behavioral stress responses was through the pituitary-adrenal axis. However, further investigation in monkeys involving controlled complete destruction of the adrenal glands and damage to the pituitary gland accompanied by continued stimulation to the septal region disclosed that the chemical mechanism associated with stressful behavior is not activated through the pituitary-adrenal axis as was previously almost universally advocated. It is true that analogous changes in the measurements of stress chemistry are achieved when the pituitary-adrenal axis is stimulated, but these changes also take place in the absence of the adrenal glands by stimulation of the septal region. Thus, the conclusion can be reached that a chemical release occurs directly from the septal region of the brain with stimulation, such chemical release profoundly affecting bodily chemistry.

The exact nature of the abnormal chemistry mechanism which is associated with the specific physiological abnormalities reported above is not exactly clear. However, it has been found that, in schizophrenics there is increased oxidation of several important bodily products, as for example, adrenalin and glutathione as well as others. This phenomenon also occurs in normals during sleep and in persons without psychotic behavior during acute infectious disease processes. Successful studies have been conducted to identify this abnormal chemistry mechanism by isolating basic enzymatic products which may be qualitatively different, possibly in molecular configuration in schizophrenics and normals. As a result, an enzymatic product, an essential part of which is a globulin molecule, has been obtained from the serum of schizophrenic patients which, when given to monkeys, produces behavior resembling that seen in schizophrenic patients as well as the same abnormal recordings from the septal region and hippocampus that have been reported as being apparently specific in schizophrenic patients. Likewise, this substance, when administered to a limited number of nonpsychotic humans, has produced a picture of schizophrenic behavior for periods of time up to two hours. Similar substances extracted from serum of normals by the same method have not produced the behavioral and physiological changes in monkeys nor the behavioral changes in nonpsychotic humans. Studies directed towards identifying this substance, although not complete, suggest a different molecular configuration when such substance is obtained from schizophrenics than when it is obtained from normals. It seems probable that the psychotic symptoms are the result of metabolic changes that follow the introduction of this substance.

Correction of the foregoing in schizophrenics was the problem solved by our therapeutic agent. Temporary results were achieved by aforesaid electrical stimulation in the septal region of the brain. However, lasting results were obtained through the production and utilization of our novel composition.

The foregoing relationship between adrenalin metabolism and the basic chemical metabolic deficiency which we have noted in schizophrenics is further pointed out by the observations that overt psychotic symptoms will often appear in the schizophrenic in association with acute stress. It should be noted that stress is associated with outpouring of adrenalin and, therefore, where chemical metabolic deficiency exists, the release of more adrenalin would lead to more of its abnormal degradation products. This supports the contention of a basic metabolic deficiency in schizophrenics that makes for abnormal metabolism of certain products.

To preliminarily summarize, our novel composition appears to correct the basic chemical abnormalities detected in schizophrenic patients. This is evidenced by improvement in behavior as well as a change toward normal in tests which reflect the chemical abnormality described heretofore, namely, in reduction in the speed of adrenalin oxidation and an increase in the levels of glutathione. Furthermore, recordings obtained from the septal region and hippocampus have reverted toward normal in schizophrenic patients after they have received this substance. Thus, the end result of the administration of this composition appears to be towards normalization of behavior, physiological activity of the specific regions of the brain and a correction of those alterations in bodily chemistry which, as a result of our experience, appear to be correlated with the abnormal physiological activity of the septal region.

With the above in mind, the principal object of the present invention is to provide a new composition of matter for the treatment of mental illness and to a process for preparation thereof.

A more specific object of the invention is to provide a therapeutic compound utilized in the treatment of schizophrenia, a major mental disease, by combatting chemical metabolic deficiency and associated physiological abnormalities in the body.

Another object of the invention is to provide a new composition of matter obtained by hydrolysis of the septal region of the brain.

A further object of the invention is to provide a new composition of matter obtained by hydrolysis of the protein containing tissue material from the septal region of the brain.

An additional object of the invention is to provide a method for preparing a new therapeutic compound comprising providing protein containing tissue material from the septal region of the brain and treating said tissue with an enzyme for a time sufficient to form polypeptides.

Still another object of the invention is to provide a method for the production of a therapeutic compound used in the treatment of schizophrenia, said method comprising providing a quantity of septal tissues of animal brain, grinding said tissues, suspending said ground tissues in a protein non-solvent, filtering and washing said slurry with a protein non-solvent, drying the filtered solids, suspending the said dried solids in water, adding trypsin, adjusting the alkalinity of the resulting solution to pH of about 8.0 and digesting, adjusting the pH to about 7.0, heating the digested mixture, thickening said mixture and filtering the same, dialyzing the filtrate, freeze-drying the dialyzed material, and dissolving the freeze-dried material in water to specified concentration.

Still further objects and the entire scope of applicability of the present invention will become apparent from the detailed description given hereinafter. It should be understood, however, that the detailed description and specific examples, while indicating the preferred embodiments of the invention, are given by way of illustration only, since various changes and modifications within the spirit and scope of the invention will become apparent to those skilled in the art from this detailed description.

Reference is made to the accompanying drawings wherein FIGURE 1 is a perspective view of the bovine brain illustrating the septal region thereof.

Figure 1:
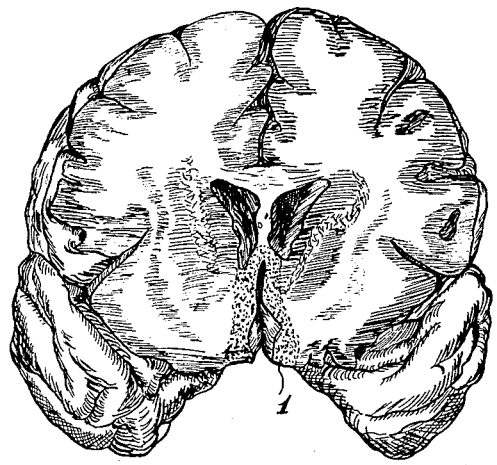

Throughout the following specific description of our novel compound and process, the term septal has been used to demarcate the area in the brain relative to our invention. Since the meaning of the term is not consistent from one authority to another, a brief description of the area to which this specification and claims apply it, is given hereinafter.

The septal region is part of the rhinencephalon system. From its anatomical relationship it would appear to be a correlating structure interposed between the higher neocortical level and the diencephalic and mid-brain structures. For a more detailed description of the exact portion of the brain with which this application is involved, see an article by Dr. Robert G. Heath, in the book entitled "Studies in Schizophrenia," Harvard University Press, 1954, pages 3 and 4.

As indicated heretofore, studies of patients with the disease schizopherenia have revealed a physiological irregularity in the brain which is associated with chemical metabolic deficiency. Accordingly, a pharmacological compound has been produced which combats this irregularity and resulting metabolic defect. Preliminary work suggested the aforementioned irregularity and such was able to be temporarily corrected in many patients by electrical stimulation to a specific part of the brain. The present invention is a result of persistent effort to evolve a drug therapy capable of continuously controlling the said deficiency and thus treat schizophrenia.

In view of the fact that this physiological irregularity and resulting chemical metabolic deficiency had been directly correlated with the septal region of the brain, as evidenced by temporary relief through electrical stimulation thereof, an extract of that specific part of the brain, as taken from animals, was prepared and found to temporarily correct biochemical deficiency and significantly lessen a schizophrenic's phychotic behavior.

Testing with animals was conducted for almost a year before application of the novel composition was made on humans. These animal tests established that the composition was safe and that it could act as replacement therapy, somewhat analogous to insulin with diabetes, thereby correcting metabolic deficiency.

Thereafter, our novel composition prepared in accordance with the process to be described herein was administered to phychotic schizophrenic patients. For the therapeutic trial only patients who failed to respond to all other known treatments were employed. The particulars of typical tests are hereinafter set forth and it can be appreciated that the therapeutic response was significant.

I

Thirteen patients were treated over a period of at least five weeks to over six months. All had classical symptoms of schizophrenia for many years. For illustrative purposes, three specific cases are noted. All were ill for prolonged periods; five years in one case, ten in another, and fifteen in a third. Two patients were not completely removed from reality in that they could recognize people, converse, etc., despite the fact that they heard voices and had delusional ideas for prolonged periods. Their response was quite prompt and dramatic.

The third patient had been completely out of all contact from thirteen to fifteen years. He had scarcely spoken over this period and spent his entire time standing in a corner and laughing to himself. His improvement was more gradual but only in that it required a more prolonged period of time for him to become oriented to his present environment. It is logical that a person out of contact for so long a period would require a much longer time before he would be able to take his place in society without residual symptoms. Again, however, the hallucinations disappeared promptly.

II

Ten more chronic patients were started on the compound of this invention and they, too, had gratifying response. Here, again, one patient was more completely out of contact for a more prolonged period of time and, thus, was slower in entering into society and becoming completely symptom-free. However, basic schizophrenic symptoms were significantly improved in a short time. Thereafter, it was merely a problem of rehabilitation and accustoming the treated patient to the realities of present day life.

The process for production of the serum is subject to variation. Numerous modifications are contemplated, as will be noted hereinafter. However, the preferred modification comprises the following steps.

A quantity of septal brain tissue is obtained from the brains of vertebrates such as cattle, swine, sheep, fish, or other vertebrates that are readily available. Preferably, the brains of cattle are used. This tissue has to be separated from the remainder of the brain with extreme precision in order to obtain optimum results from the end product.

Figure 2:
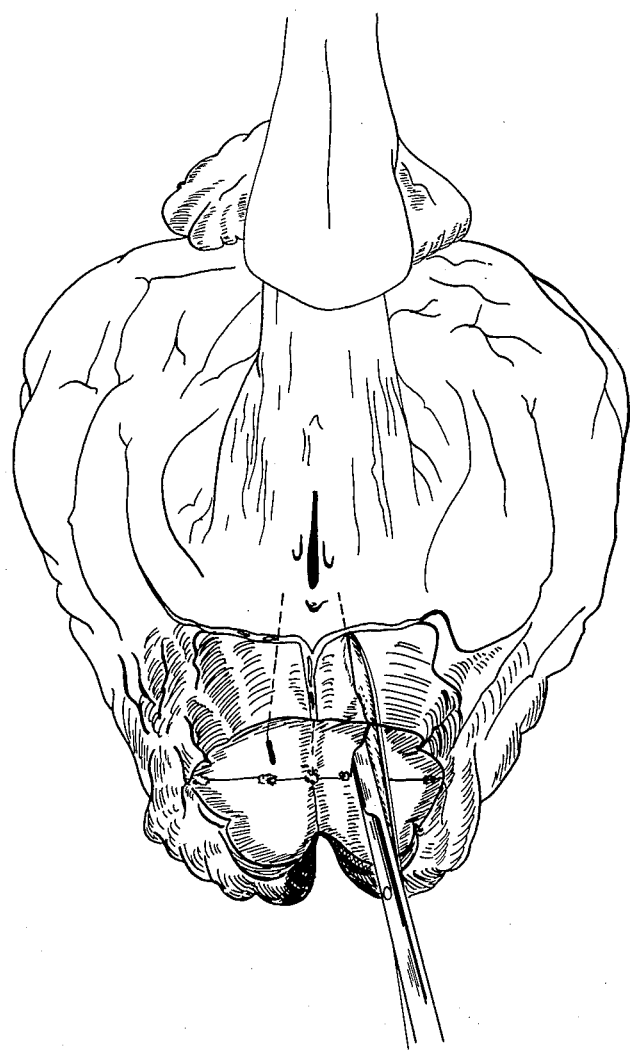
FIGURE 2 is a perspective view of the bovine brain illustrating the particular portion thereof being removed for use in the preparation of our novel composition.

Referring to FIGURE 1, the region 1 is the septal region. In order to remove the same, four basic incisions are required, as listed below and the first of which is illustrated in FIGURE 2.

(1) Slice of the ventral aspect of the brain just rostral to the tip of the lateral ventricle.
(2) Longitudinal cut through the base of the brain into the lateral ventricle which extends caudally on both sides to the rostral end of the third ventricle.
(3) Dorsal cut through the septum pellucidum near the roof of the lateral ventricles extending from the rostral tip of the anterior horn of the lateral ventricles caudally to the rostral tip of the third ventricle.
(4) The final cut to remove the septal region. This is made just rostral to the third ventricle.

Figure 3:
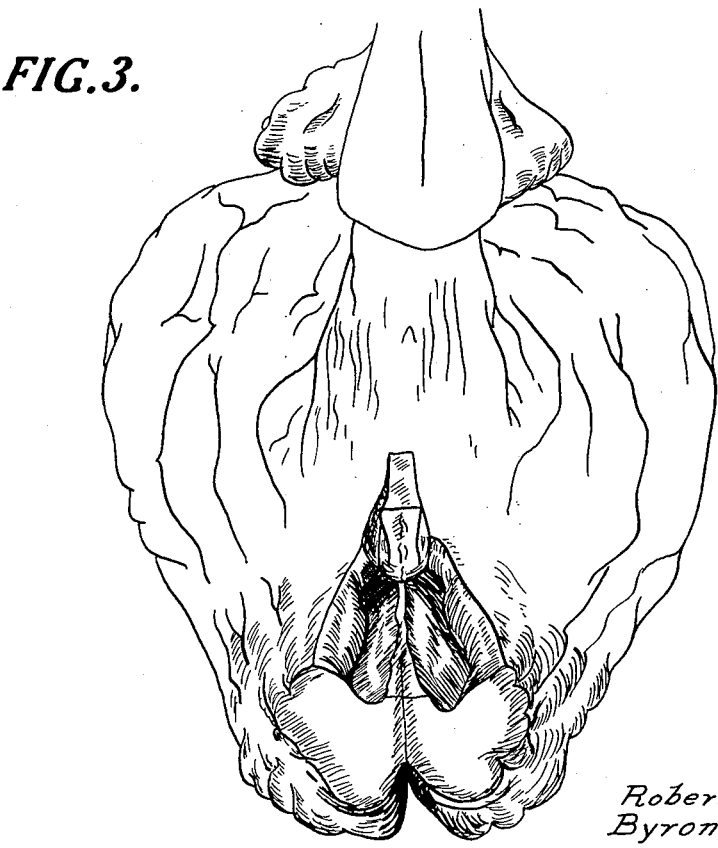
FIGURE 3 is a perspective view of the bovine brain with the septal tissue removed therefrom.

FIGURE 3 illustrates the brain following removal of the septal tissue. The particular region from where such tissue is obtained is clearly shown.

Figure 4:
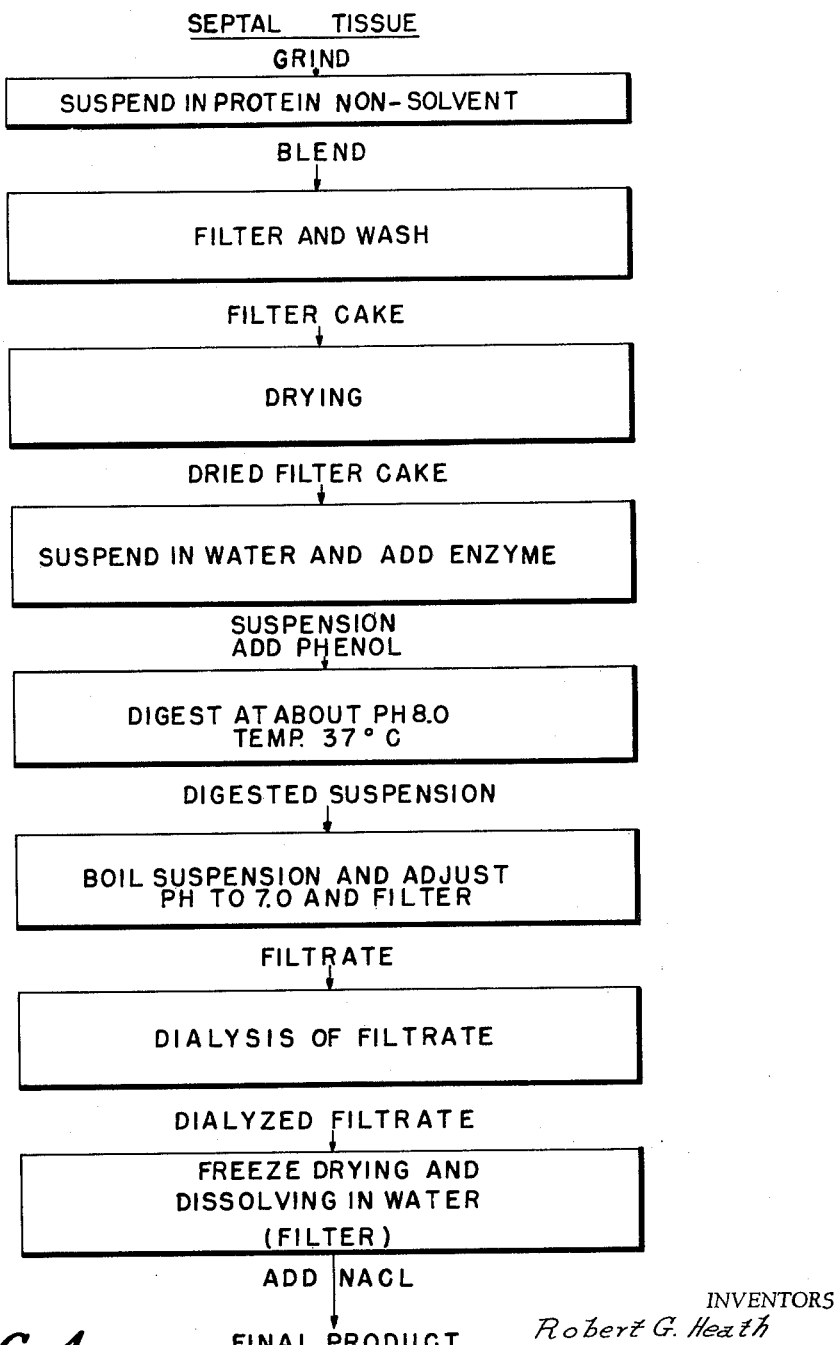
FIGURE 4 is a block diagram illustrating the various process steps used in one modification of the process of our invention.

As previously stated, FIGURE 4 represents one detailed modification of the process used to obtain the novel therapeutic agent and variations therein will be specifically set forth. The septal brain tissues thus provided are first ground or minced in a meat grinder for ease of extraction. The ground material is then suspended in a liquid which is preferably a protein non-solvent. The best protein non-solvent is a ketone such as acetone, but other protein non-solvents such as ethers, e.g., ethyl ether; alcohols, e.g., methyl alcohol, ethyl alcohol, propyl alcohol, etc., are contemplated. It should be understood that although the use of the foregoing protein non-solvents is preferred, the ground or minced brain tissues can alternatively be suspended in any normal aqueous solution.

The suspension is blended in a Waring Blendor type apparatus. The time of blending varies with the amount of tissues being treated.

The volume of the suspension can thereafter be increased, preferably, about ten times the weight of the wet tissue, by the addition of a further quantity of suspending liquid and refrigerated overnight. The resulting slurry is then filtered or centrifuged and washed thoroughly with additional liquid. The filtrate is then discarded and the filter cake is dried. At this point, the filter cake has been freed of any impurities soluble in the suspending liquid.

The dried powder is then suspended in water (about 2 to 15 ccs. per gram) and the resulting suspension can, if desired, be centrifuged to remove additional heavy impure particles. However, this centrifuging step can be omitted in many instances.

Likewise, if desired, the dried powder can again be washed with protein non-solvent and dried followed by suspension in water as noted heretofore. It should be noted that this step can also many times be omitted depending upon the impurity of the starting material and the degree of purity desired in the end product.

In connection with the foregoing, it has been stated that the centrifuging and re-suspension steps can be omitted depending upon the purity of the starting material and the degree of purity desired in the end product. It should be emphasized that if the starting material is sufficiently pure, such material can be directly suspended in aqueous solution without any utilization of the above outlined filtration.

The resulting suspension is then hydrolyzed, i.e., the tissue material is subjected to a breakdown process whereby the active component material of the therapeutic agent is realized. Various alternatives for hydrolyzing are contemplated.

Preferably, the suspension is combined with an enzymatic digesting agent. This enzyme can be the proteolytic enzyme, trypsin. However, other well known and commercially available proteolytic enzyme systems such as pepsin, popain, and others of like character having the power of breaking down protein material can be used. The amount of protein decomposing agent used varies, but is normally from about 5 to 15% by dry weight of the material in suspension, with 10% being preferred.

The suspension is then subjected to a digestion period during which protein breakdown takes place. In connection therewith, about 0.1 to 2% by weight/volume of an anti-bacterial agent such as phenol is added to prevent bacterial growth during the digestion period. Also, the pH of the suspension is periodically adjusted to between 7.5 and 8.5, with 8.0 being preferred, by the addition of an alkali such as sodium hydroxide. Digestion is carried out under such conditions and at a temperature varying from 20 to 45 degrees C., but preferably about 37 degrees C. The time of digestion varies, of course, with the amount of material being treated and the amount of protein breakdown desired. For batches of raw material of about 1000 grams, the digestion time is not more than about five hours.

At the end of digestion, the pH of suspension is adjusted to between about 5.0 and 7.5 with 7.0 being preferred, by means of a concentrated mineral acid such as hydrochloric acid or sulphuric acid, to halt protein breakdown. The digested suspension may then be placed in a boiling water bath for a time period ranging from about 10 to 60 minutes, and normally about 30 minutes, although such step is contemplated only in the preferred procedure.

It was stated heretofore that other means for hydrolyzing the suspended material can be used as a substitute for the enzyme digestion procedure. Such other means include:

(a) The suspension is adjusted to a pH of between 7 and 10, preferably pH 9, by the addition of an alkali such as sodium hydroxide. Thereafter, heating is carried out at a temperature of between 50 and 70 degrees C., preferably 55 degrees C. for a time period of at least four hours. During this time period hydrolysis is taking place and such ceases after heating is terminated.

(b) The suspension is adjusted to a pH of between 2 and 5, preferably pH 4, by the addition of an acid such as acetic, hydrochloric, or sulphuric acid. Thereafter, heating is carried out at a temperature of between 50 and 70 degrees C., preferably 55 degrees C. for a time period of at least four hours. During this time period hydrolysis is taking place and such ceases after heating is terminated.

(c) To the suspension is added water in physiological saline form (0.9–1.2% sodium chloride solution), following which the solution is heated to a temperature of from 25 to 50 degrees C., preferably 37 degrees C., for a time period of from four to six hours. During this time period, hydrolysis is taking place and such ceases after heating is terminated.

(d) Hydrolysis of the suspended material can also be practically carried out solely by the application of heat and pressure. No specific ranges of such heat and pressure can be set forth since the values utilized vary in large part with the amount and character of the suspended material being hydrolyzed.

At this stage, because of the protein breakdown action of the protein affecting hydrolysis, the suspension is conditioned for use as a therapeutic agent including the active ingredients of the final product. It is difficult to determine the exact ingredients that aid in the treatment of schizophrenia. However, indications are that the ingredients are polypeptides, lipids, or polysaccharides, probably polypeptides.

The hydrolyzed suspension can then be first cooled in a refrigerator or immediately filtered, following the addition of a filter aid such as celite AR, a diatamaceous earth. This filter aid is added until a thick paste is formed to which water is added to about 1½ times the original volume of suspension, or more as needed, for the purpose of washing the filter cake. Supercentrifuging can be used as an alternative to filtering.

Alternatively, the cooled hydrolyzed suspension can be treated with an alcohol, e.g., ethyl alcohol, and then filtered, with the filter cake being discarded. The filtrate is then combined with a ketone, e.g., acetone, and filtered, the filter cake then being washed with an additional amount of said ketone. The washed filter cake is then suspended in a minimum amount of distilled water.

The filtrate or suspended filter cake, depending upon the step used, is then subjected to dialysis, normally in cellophane bags against running water. The time of dialysis varies depending upon the amount of solution. However, normally, a period of from about 10 to 30 hours, with 16 hours being preferred, is sufficient. Other dialyzing material than cellophane is, of course, contemplated. Dialysis is normally carried out at below 20 degrees C.

Dialysis is carried out in order to remove contaminants of low molecular weights. Of course, other known methods could be used to accomplish such removal as, for example, the use of ion-exchange resins or by electrolysis.

The solution remaining in the dialyzing bags can then be subjected to additional dialysis or immediately freeze-dried. The additional dialysis preceding freeze-drying is optional depending upon the purity of the starting material.

The freeze-dried material is then dissolved in water to a concentration of about 1 ml. per 8 gm. of raw tissue, and sodium chloride may be added to insure an isotonic salt solution, compatible upon injection in the blood stream or into the muscle.

The resulting solution is thereafter clarified by filtering through a sterile Seitz or Berkfeld filter and placed in sterile vials for use. The solution, prior to placement in the vials, is tested for sterility by observing the amount of bacteria growth after two days of incubation at about 37 degrees C.

The foregoing process is basically one of protein breakdown of the septal region by hydrolysis, preferably enzymatic digestion. Understandably, this process is subject to substantial variation within the general framework and desired results noted heretofore. Possible variations in process technique are summarized hereinafter.

The ground septal tissues following suspension can then be subjected to precipitation with metallic salts of lead, copper, zinc, iron and aluminum. The precipitate, of course, includes the potential active component. This precipitate can then be suspended in water followed by hydrolysis. Suitable steps are thereafter carried out to regenerate the active components from the metal complex of the original precipitate. For example, a precipitant for the particular metallic ions used can be added to form a precipitate.

In addition, prior to or after hydrolysis, various solvent combinations with an immiscible solvent can be used to concentrate the active components by using known counter-current distribution techniques.

Likewise, ion exchange chromatography can be used for separation and isolation of the active components in the septal tissues. Cationic and anionic resin can be used as ion exchange resins.

Along the same line, absorption chromatography can be used for the purposes of extraction and purification. Absorbents than can be employed include aluminum trioxide and silica gel.

It might be noted that grinding of the raw septal tissues, although preferred, is not the only means contemplated. The tissues may be pressed, dispersed or hashed with like results.

Specific examples illustrating our improved process may be set out as follows.

Example 1

Septal tissues obtained from 565 cows in accordance with the procedure described heretofore, weighing 1004 grams, were ground in a meat grinder while in a frozen state. The ground tissues were then blended in a Waring Blendor with acetone for three minutes in small batches. The volume was made up with acetone to approximately 10 to 1 and stored in a refrigerator at 5 degrees C. overnight.

The acetone slurry was removed from the refrigerator, filtered on a large Büchner funnel and washed thoroughly with acetone. The filter cake was then dried under a vacuum and found to weigh 168 grams.

This powder was then suspended in 1000 ccs. of water and mixed in the Waring Blendor for three minutes while 10 grams of commercial trypsin was being added. To this suspension was added 10 grams of phenol as a preservative.

The pH of the suspension was adjusted to 8.0 with the addition of 69 ccs. of 5% sodium hydroxide. The resulting suspension was thereafter digested at 37 degrees C. for five hours. Every thirty minutes, the pH of the suspension was adjusted to 8.0 by the addition of sodium hydroxide.

At the end of five hours of digestion, the pH of the suspension was adjusted to 7.0 by the addition of 6.7 ccs. of concentrated hydrochloric acid accompanied by heating in a boiling water bath for thirty minutes. The cooled suspension was then filtered in a large Büchner funnel containing a ¼ inch layer of a diatomaceous earth. Additional of such filter aid was first added to the suspension to form a thick paste. The resulting filter cake was washed repeatedly with water. The mixture was very hard to filter and the total time required for this filtration was approximately seven hours. The total volume of filtrate collected was approximately 1500 ccs.

This solution was dialyzed in cellophane bags against running tap water for a period of about fifteen hours, and then freeze-dried. The freeze-dried preparation was then dissolved in water and the volume was made to exactly 250 ccs. To this solution was added 4.5 grams of sodium chloride following which the solution was filtered through a small pad of celite.

The clear solution was then passed through a sterile Seitz filter and the filtered solution was transferred to 10 cc. sterile vials. A group of 23 vials was obtained. The sterile solution prior to filling the vials was tested for sterility and no growth was observed in the tubes after two days of incubation at 37 degrees C.

Example II

The process of Example I was carried out with the addition of the following steps. After the septal tissues and acetone slurry was filtered with the obtaining of a dried filter cake, the filter cake was suspended in 1000 ccs. of water and mixed in the Waring Blendor for three minutes. The heavier particles were then centrifuged out of the suspension at 5 degrees C. at a speed of 2700 r.p.m. for fifteen minutes. The insoluble residue was resuspended in 400 ccs. of water and again centrifuged. The two extracts were combined and diluted ten times with acetone. The resulting suspension was stored in a refrigerator overnight at a temperature of about 5 degrees C.

The suspension, after refrigeration overnight, as aforesaid, was collected on a Büchner filter and washed repeatedly with acetone. The filter cake was dried under a vacuum and weighed 139 grams. The filter cake was then blended along with the addition of commercial tryspin and subsequent steps in accordance with Example I were carried out to realize a purer end product.

Example III

The process of Example I was carried out through the tryptic digestion on septal tissues obtained from 410 pigs and weighting 1490 grams. Thereafter, to a resulting solution of 1250 ml., was added 2500 ml. of ethyl alcohol, followed by filtering on a celite pad. The filter cake was washed two times with 600 ml. portions of 2:1 ethyl alcohol-water solutions. To the combined filtrates of 3500 ml. was added 14,000 ml. of acetone to make a total volume of 17,500 ml. The resulting precipitate was collected on a Büchner funnel and washed with acetone, giving a brown pasty solid. The filter cake was suspended in 1200 ml. of water and dialyzed. The remaining steps carried out correspond to Example I commencing with dialysis.

Example IV

The process of Example I was carried out through the enzyme digestion but with the substitution of 50.8 grams of pepsin at pH 4 for the trypsin at pH 8. Of course, neutralization to pH 7 was now accomplished by the utilization of NaOH rather than mineral acid. Septal tissues obtained from 918 cows and weighing 3079 grams were used. Following digestion, a resulting solution of 2880 ml. was centrifuged in a Sharples centrifuger at 20,000 r.p.m. for approximately two hours. The resulting centrifugate was then treated in accordance with the remaining steps of Example I commencing with dialysis.

Example V

Septal tissues obtained from 1,049 cows in accordance with the procedure described heretofore were ground and placed in aqueous suspension. The resulting suspension was then hydrolyzed by enzymatic digestion as outlined in Example I and the remaining purification steps carried out likewise as outlined therein. A clear sterile and active solution was obtained.

Example VI

The procedure of Example I was applied to 520 cattle brains averaging 3.3 grams for each brain, through the digestion step. The filtrate obtained after filtering was immediately put over a IR-120 ion-exchange resin (hydrogen form) column, 2 inches in diameter and 30 inches long, in a cold room. Flow rate was adjusted to 150 drops per minute. Light brown, very acidic effluent and 1½-2 liters of water wash were set aside.

Each IR-120 resin column was eluted with 2500 ml. of 2.3 N hydrochloric acid at the same flow rate as above Each acid eluate was neutralized with sodium hydroxide at frequent intervals during the elution.

Each clear neutralized eluate was then dialyzed and the procedure of Example I was carried out to yield a combined final product of 213 ml. in appropriate vial form.

Example VII

Septal tissues obtained from 625 cows in accordance with the procedure described heretofore, weighing 1125 grams, were dispersed while in frozen state. The tissues were then blended in a Waring Blendor with ethyl alcohol for 5 minutes in small batches. The volume was made up with ethyl ether to approximately 10:1 and stored in a refrigerator at 5 degrees C. overnight. The slurry was removed from the refrigerator, filtered on a large Büchner funnel and washed thoroughly with ethyl alcohol. The filter cake was then dried under a vacuum and found to weigh 188 grams.

This powder was then suspended in 1100 ccs. of water and the pH of the suspension was adjusted to pH 9 by the use of sodium hydroxide. To this suspension was added 10 grams of phenol as a preservative.

The resulting suspension was thereafter heated at a temperature of 55 degrees C. for 5 hours. Every 30 minutes the pH of the suspension was adjusted to 9.0 by the addition of sodium hydroxide.

At the end of the 5 hour period of hydrolysis, the suspension was allowed to cool. The cool suspension was then purified as in Example I to yield a group of 26 vials of the final product.

Example VIII

The procedure of Example VII was followed, except that the suspension was adjusted to pH 4 by the addition of hydrochloric acid as an alternative means of carrying out hydrolysis.

Example IX

Septal tissues obtained from 520 cows in accordance with the procedure described heretofore, weighing 985 grams were dispersed while in a frozen state. The tissues were then blended in a Waring Blendor with acetone for 3 minutes in small batches. The volume was made up with ethyl ether to approximately 10:1 and stored in a refrigerator at 5 degrees C. over night. The slurry was removed from the refrigerator, filtered on a large Büchner funnel and washed thoroughly with acetone.

The filter cake was then dried under a vacuum and found to weight 140 grams.

This powder was then suspended in 900 ccs. of water. To the suspension was added additional water in physiological saline form (0.9–1.2% sodium chloride solution), following which the solution was heated to a temperature of 37 degrees C. for 5 hours.

At the end of the 5 hour period of hydrolysis, the suspension was allowed to cool. The cool suspension was then purified as in Example I to yield a group of 19 vials of the final product.

*Example X*

The procedure of Example IX was carried out, except that no physiological saline water was added. Rather, hydrolysis was carried out solely by the application of elevated temperature at 120 degrees C. and at a pressure of 15 p.s.i. in an autoclave. The time period of hydrolysis was 60 minutes, following which final purification was carried out as disclosed heretofore.

Throughout this specification, it has been emphasized that the septal region of the brain, as defined, is the basis upon which this invention hinges both as to effect thereof on mental behavior and to the use thereof in the preparation of our novel composition. The exact active components which contribute to the therapeutic treatment involved are not as yet capable of exact definition. However, it is contemplated that, upon suitable identification thereof, a synthetic means for producing the same will be achieved.

With respect to the experimental tests noted, it can be appreciated that animals were first utilized. To this extent, our invention has been and can be used to control the mental behavior of test animals having schizophrenic characteristics.

The above described novel composition and process for the preparation thereof have resulted in the successful treatment of mental illness and, particularly, schizophrenia. The procedures and apparatus for achieving such product can be substantially varied as noted heretofore. However, it has been shown that when these features are controlled, desired results are achieved.

It should be emphasized that, although the novel therapeutic agent disclosed herein has been primarily utilized in the successful treatment of schizophrenia, our invention is not limited thereto. It is contemplated that the therapeutic agent can likewise be used to treat other illnesses of the human body. For example, successful application to the treatment of psychomotor epilepsy has already been realized.

The novel principles of this invention are broader than the specific embodiments recited above and rather than unduly extend this disclosure by attempting to list all the numerous modifications which have been conceived and reduced to practice during the course of this development, these novel features are covered in the following claims.

We claim:

1. A process of preparing a new therapeutic agent for the treatment of schizophrenia and other mental illnesses which comprises subjecting protein and protein complex containing tissue material from the septal region of the brain to hydrolysis for a time sufficient to form the active component of the therapeutic agent, terminating hydrolysis, and purifying the resulting activated material.

2. A therapeutic agent for treating schizophrenia and other mental illnesses obtained by the process of claim 1.

3. A process as claimed in claim 1 wherein said hydrolysis step comprises proteolytic enzyme digestion and said enzyme is trypsin.

4. A process as claimed in claim 1 wherein said septal region is of bovine brain.

5. A process as claimed in claim 1 wherein prior to hydrolysis, the tissue material is treated with a non-solvent for the protein and protein complexes therein whereby the material soluble in said protein non-solvent is removed from the protein and protein complex fraction of the said tissue material.

6. A process as claimed in claim 1 wherein said hydrolysis step comprises suspending said tissue material in a liquid, adjusting the pH of said liquid to a range of between pH 7 and pH 10 with an alkali, heating said liquid at a temperature of between 50 and 70 degrees C. for a time sufficient to form the active component of the therapeutic agent.

7. A process as claimed in claim 1 wherein said hydrolysis step comprises suspending said tissue material in a liquid, adjusting the pH of said liquid to a range of between pH 2 and pH 5 with an acid, heating said liquid at a temperature of between 50 and 70 degrees C. for a time sufficient to form the active component of the therapeutic agent.

8. A process as claimed in claim 1 wherein said hydrolysis step comprises suspending said tissue material in a liquid, adding water in physiological saline form, heating said liquid at a temperature of between 25 and 50 degrees C. for a time sufficient to form the active component of the therapeutic agent.

9. A process of preparing a new therapeutic agent used for the treatment of schizophrenia and other mental illnesses comprising subjecting a quantity of septal tissues of cattle brain to grinding, suspending said ground tissues in a liquid to form a suspension, filtering and washing said suspension with a protein non-solvent, drying the filtered solids, suspending the said dried solids in water, adding a proteolytic enzyme, adjusting the alkalinity of the resulting suspension to pH of about 8.0 and digesting, adjusting the pH to about 7.0, heating the digested suspension, thickening said suspension and filtering the same, dialyzing the filtrate, freeze-drying the dialyzed solution and dissolving the freeze-dried material in water to a specified concentration.

References Cited in the file of this patent

Goodwin: The Pharmaceutical Journal, vol. 181, No. 4952, September 27, 1958, pp. 233 and 235.

Modell: J.A.M.A., vol. 167, No. 18, August 30, 1958, pp. 2190–2199.

Simon: Am. J. Phychiatry, vol. 114, No. 12, June 1958, pp. 1077–1086.